United States Patent
Kobayashi et al.

(10) Patent No.: US 9,385,584 B2
(45) Date of Patent: Jul. 5, 2016

(54) VOLTAGE REGULATOR

(71) Applicant: Seiko Instruments Inc., Chiba-shi, Chiba (JP)

(72) Inventors: Yuji Kobayashi, Chiba (JP); Teruo Suzuki, Chiba (JP)

(73) Assignee: SII Semiconductor Corporation (JP)

( * ) Notice: Subject to any disclaimer, the term of this patent is extended or adjusted under 35 U.S.C. 154(b) by 0 days.

(21) Appl. No.: 14/504,133

(22) Filed: Oct. 1, 2014

(65) Prior Publication Data
US 2015/0097543 A1    Apr. 9, 2015

(30) Foreign Application Priority Data
Oct. 3, 2013    (JP) .................................. 2013-208142

(51) Int. Cl.
| | | |
|---|---|---|
| G05F 1/00 | (2006.01) |
| H02M 1/08 | (2006.01) |
| G05F 1/56 | (2006.01) |
| G05F 1/46 | (2006.01) |
| G05F 1/567 | (2006.01) |

(52) U.S. Cl.
CPC ............... *H02M 1/08* (2013.01); *G05F 1/468* (2013.01); *G05F 1/56* (2013.01); *G05F 1/567* (2013.01)

(58) Field of Classification Search
USPC ................... 323/272, 274, 282, 284
See application file for complete search history.

(56) References Cited

U.S. PATENT DOCUMENTS

| | | | | |
|---|---|---|---|---|
| 7,973,521 B2 * | 7/2011 | Chen ..................... | G05F 1/56 323/273 |
| 2008/0284395 A1 * | 11/2008 | Wang ..................... | G05F 1/56 323/282 |
| 2008/0290734 A1 * | 11/2008 | Nishigata ............... | H02M 3/156 307/80 |
| 2009/0058384 A1 * | 3/2009 | Taniguchi ............... | G05F 3/30 323/282 |
| 2009/0153122 A1 * | 6/2009 | Kawagishi ............... | G05F 1/56 323/284 |
| 2013/0002220 A1 * | 1/2013 | Terada ..................... | G05F 1/56 323/282 |
| 2014/0347027 A1 * | 11/2014 | Jayaraj .................. | H02M 3/1563 323/282 |

FOREIGN PATENT DOCUMENTS

JP        9-326469 A     12/1997

* cited by examiner

*Primary Examiner* — Adolf Berhane
*Assistant Examiner* — Gary Nash
(74) *Attorney, Agent, or Firm* — Brinks Gilson & Lione (57) ABSTRACT

Provided is a voltage regulator including a leakage current correction circuit capable of keeping the accuracy of an output voltage of the voltage regulator even when an output voltage of a reference voltage circuit is decreased due to the influence of a leakage current. The voltage regulator includes: a reference voltage circuit configured to output a reference voltage; an output transistor configured to output an output voltage; a voltage divider circuit configured to divide the output voltage to output a feedback voltage; an error amplifier circuit configured to amplify a difference between the reference voltage and the feedback voltage, and output the amplified difference to control a gate of the output transistor; and a leakage current correction circuit connected to an output terminal of the voltage divider circuit. The leakage current correction circuit is configured to decrease the feedback voltage to prevent the output voltage from dropping at high temperature.

3 Claims, 7 Drawing Sheets

VOLTAGE REGULATOR

RELATED APPLICATIONS

This application claims priority under 35 U.S.C. §119 to Japanese Patent Application No. 2013-208142 filed on Oct. 3, 2013, the entire content of which is hereby incorporated by reference.

BACKGROUND OF THE INVENTION

1. Field of the Invention

The present invention relates to a voltage regulator configured to keep the good accuracy of an output voltage even when a reference voltage circuit is influenced by a leakage current flowing at high temperature.

2. Description of the Related Art

Figure 7:
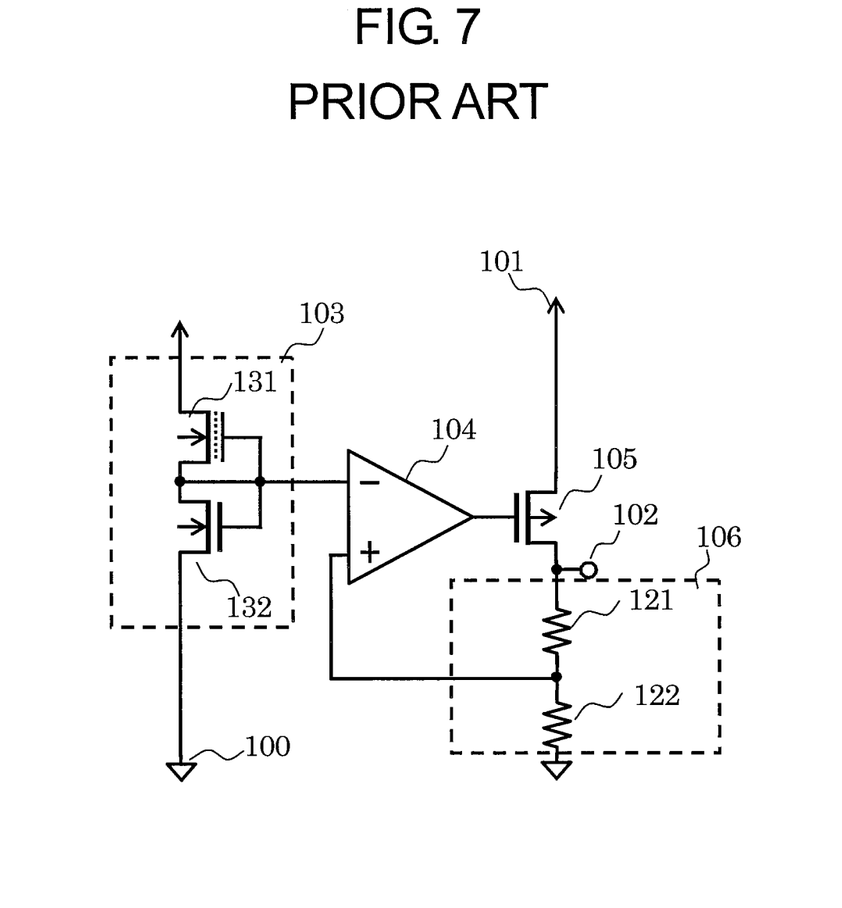
FIG. 7 is a circuit diagram illustrating a related-art voltage regulator.

A related-art voltage regulator is now described. FIG. 7 is a circuit diagram illustrating the related-art voltage regulator.

A differential amplifier circuit 104 compares a reference voltage (VREF) of a reference voltage circuit 103 and a feedback voltage (VFB) of a voltage divider circuit 106, and controls a gate voltage of an output transistor 105 so that the VREF and the VFB have the same value. When an output voltage of an output terminal 102 is represented by VOUT, the output voltage VOUT is obtained by the following expression.

$$VOUT=(RS+RF)/RS \times VREF \quad (1)$$

where RF represents the resistance value of a resistor 121 and RS represents the resistance value of a resistor 122.

The reference voltage circuit 103 includes a depletion type NMOS transistor 131 and an NMOS transistor 132, and is controlled to improve the temperature characteristics of the reference voltage circuit 103 and keep the accuracy of the output voltage VOUT with respect to temperature (for example, see Japanese Patent Application Laid-open No. Hei 9-326469).

Figure 6A:
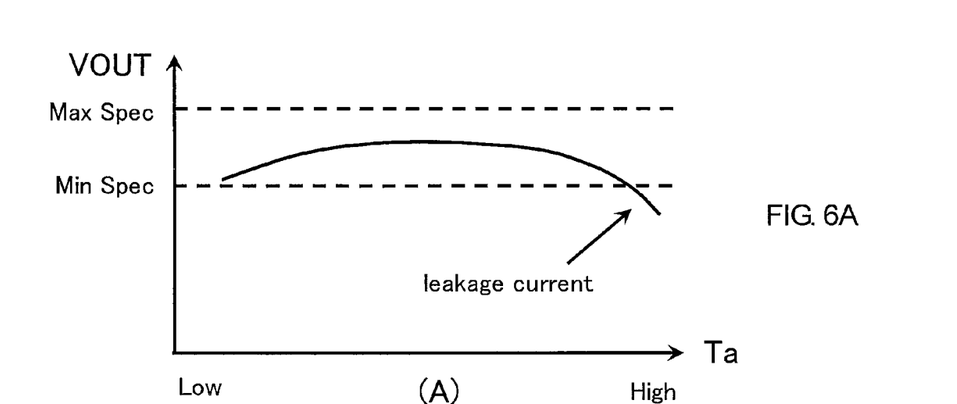
FIGS. 6A to 6C are graphs showing temperature characteristics of an output voltage of the voltage regulator and a leakage current.

However, the related art has a problem in that, when the voltage regulator enters such a high temperature state that the NMOS transistor 132 and the depletion type NMOS transistor 131 that form the reference voltage circuit 103 cause a junction leakage current and a channel leakage current to flow, the VREF is decreased due to the influence of the leakage currents and the output voltage VOUT is decreased accordingly (see FIG. 6A). Further, there is another problem in that the accuracy of the output voltage VOUT cannot be kept within a certain range due to the influence of the leakage current flowing at high temperature.

SUMMARY OF THE INVENTION

The present invention has been made in view of the problems described above, and provides a voltage regulator including a leakage current correction circuit capable of keeping the accuracy of an output voltage of the voltage regulator even when an output voltage of a reference voltage circuit is decreased due to the influence of a leakage current.

In order to solve the problems of the related art, a voltage regulator according to one embodiment of the present invention has the following configuration.

Specifically, there is provided a voltage regulator, including: a reference voltage circuit configured to output a reference voltage; an output transistor configured to output an output voltage; a voltage divider circuit configured to divide the output voltage to output a feedback voltage; an error amplifier circuit configured to amplify a difference between the reference voltage and the feedback voltage, and output the amplified difference to control a gate of the output transistor; and a leakage current correction circuit connected to an output terminal of the voltage divider circuit, the leakage current correction circuit being configured to decrease the feedback voltage to prevent the output voltage from dropping at high temperature.

The voltage regulator including the leakage current correction circuit according to one embodiment of the present invention can decrease the feedback voltage by using the off leakage current of the leakage current correction circuit at high temperature, and thus can suppress the decrease in output voltage VOUT. In addition, the influence of the off leakage current can be reduced without any complicated configuration.

DETAILED DESCRIPTION OF THE PREFERRED EMBODIMENTS

In the following, embodiments of the present invention are described with reference to the drawings.

First Embodiment

Figure 1:
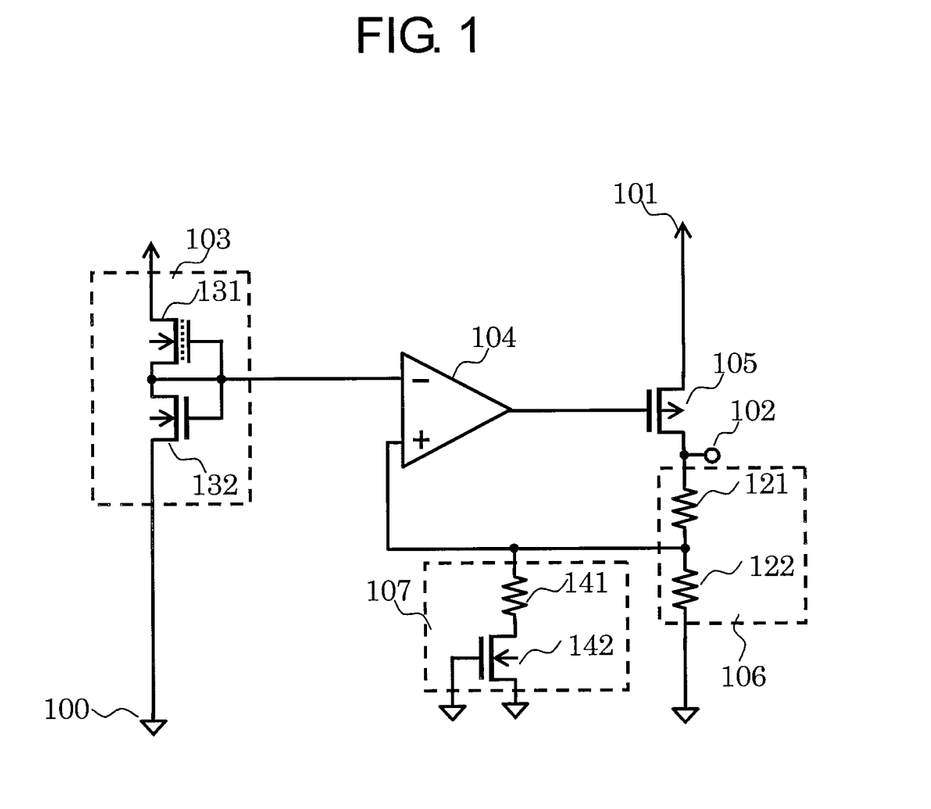
FIG. 1 is a circuit diagram illustrating a voltage regulator according to a first embodiment of the present invention.

FIG. 1 is a circuit diagram illustrating a voltage regulator according to a first embodiment of the present invention. The voltage regulator of the first embodiment includes a reference voltage circuit 103, a differential amplifier circuit 104, an output transistor 105, a voltage divider circuit 106, a leakage current correction circuit 107, a ground terminal 100, a power supply terminal 101, and an output terminal 102. The voltage divider circuit 106 includes resistors 121 and 122. The leakage current correction circuit 107 includes a resistor 141 and an NMOS transistor 142. The reference voltage circuit 103 includes a depletion type NMOS transistor 131 and an NMOS transistor 132.

The connections are now described. The depletion type NMOS transistor 131 has a gate and a source both connected to a gate and a drain of the NMOS transistor 132 and an inverting input terminal of the differential amplifier circuit 104, and a drain connected to the power supply terminal 101. The NMOS transistor 132 has a source connected to the ground terminal 100. The differential amplifier circuit 104 has an output connected to a gate of the output transistor 105, and a non-inverting input terminal connected to a node between one terminal of the resistor 121 and one terminal of the resistor 122. The output transistor 105 has a source connected to the power supply terminal 101, and a drain connected to the output terminal 102 and the other terminal of the resistor 121. The other terminal of the resistor 122 is connected to the ground terminal 100. The NMOS transistor 142 has a drain connected via the resistor 141 to the non-inverting input terminal of the differential amplifier circuit 104, and a gate and a source both connected to the ground terminal 100.

Next, the operations of the voltage regulator of the first embodiment are described. Due to the presence of the NMOS transistor 142, the leakage current correction circuit 107 does not cause a current to flow at normal temperature, and hence the operations of the voltage regulator are not influenced. By using the resistor 141, when the output voltage VOUT of the output terminal 102 fluctuates and the feedback operation of the differential amplifier circuit 104 is performed, it is possible to prevent the parasitic capacitances of the NMOS transistor 142 between the drain and the gate and between the drain and a bulk thereof from influencing the operations of the voltage regulator.

At high temperature, the NMOS transistor 132 and the depletion type NMOS transistor 131 that form the reference voltage circuit 103 decrease a reference voltage VREF that is the output voltage of the reference voltage circuit 103 in order to cause a junction leakage current. Similarly, the NMOS transistor 142 decreases a feedback voltage VFB of the voltage divider circuit 106 in order to cause an off leakage current to flow. The NMOS transistor 142 decreases the feedback voltage by the decreased amount of the reference voltage VREF, and the feedback voltage VFB and the reference voltage VREF can thus be kept to have the same value. In this way, the output of the differential amplifier circuit 104 does not change and the gate-source voltage of the output transistor 105 does not change, and hence the decrease in output voltage VOUT can be suppressed.

Figure 6B:
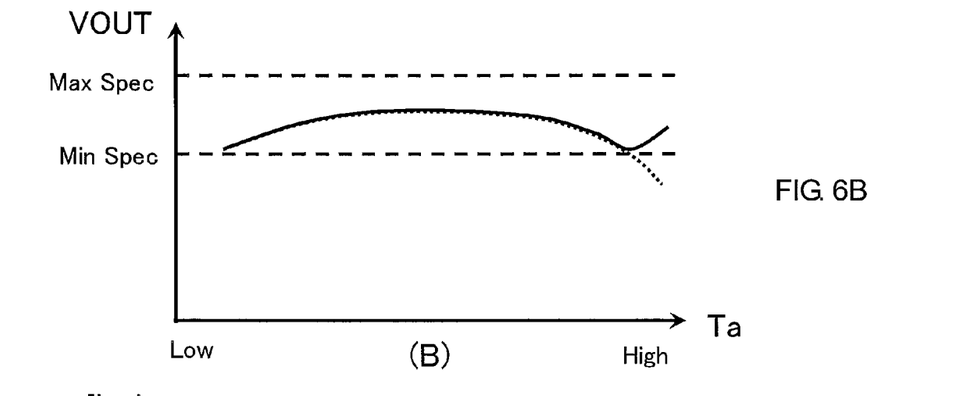
Figure 6C:
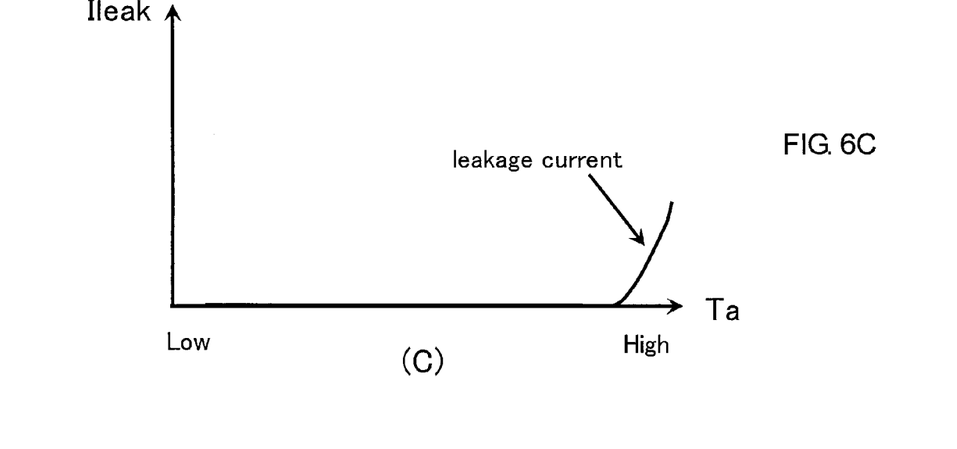

FIG. 6B shows the relationship between the output voltage VOUT of the voltage regulator of the first embodiment and temperature Ta. The decrease in output voltage VOUT can be suppressed by decreasing the feedback voltage VFB by the decreased amount of the reference voltage VREF at high temperature. When the temperature further increases, a leakage current leak is exponentially increased as shown in FIG. 6C. In this case, the ratio of the feedback voltage VFB to be decreased by the off leakage current of the NMOS transistor 142 becomes larger than the ratio of the reference voltage VREF to be decreased by the leakage current of the reference voltage circuit 103, and hence the output voltage VOUT is gradually increased along with the increase in temperature. In this way, the decrease in output voltage VOUT caused at high temperature can be suppressed. Only the resistor and the off transistor are used as elements for suppressing the decrease in output voltage VOUT, and hence the area of an IC is not increased. The influence of the off leakage current can thus be reduced without any complicated configuration.

Note that, the reference voltage circuit may have any configuration without limitation as long as the operations of the present invention are achieved.

As described above, the voltage regulator of the first embodiment can suppress the decrease in output voltage VOUT by decreasing the feedback voltage VFB of the voltage divider circuit 106 by using the off leakage current of the leakage current correction circuit 107 at high temperature. In addition, the influence of the off leakage current can be reduced without any complicated configuration.

Second Embodiment

Figure 2:
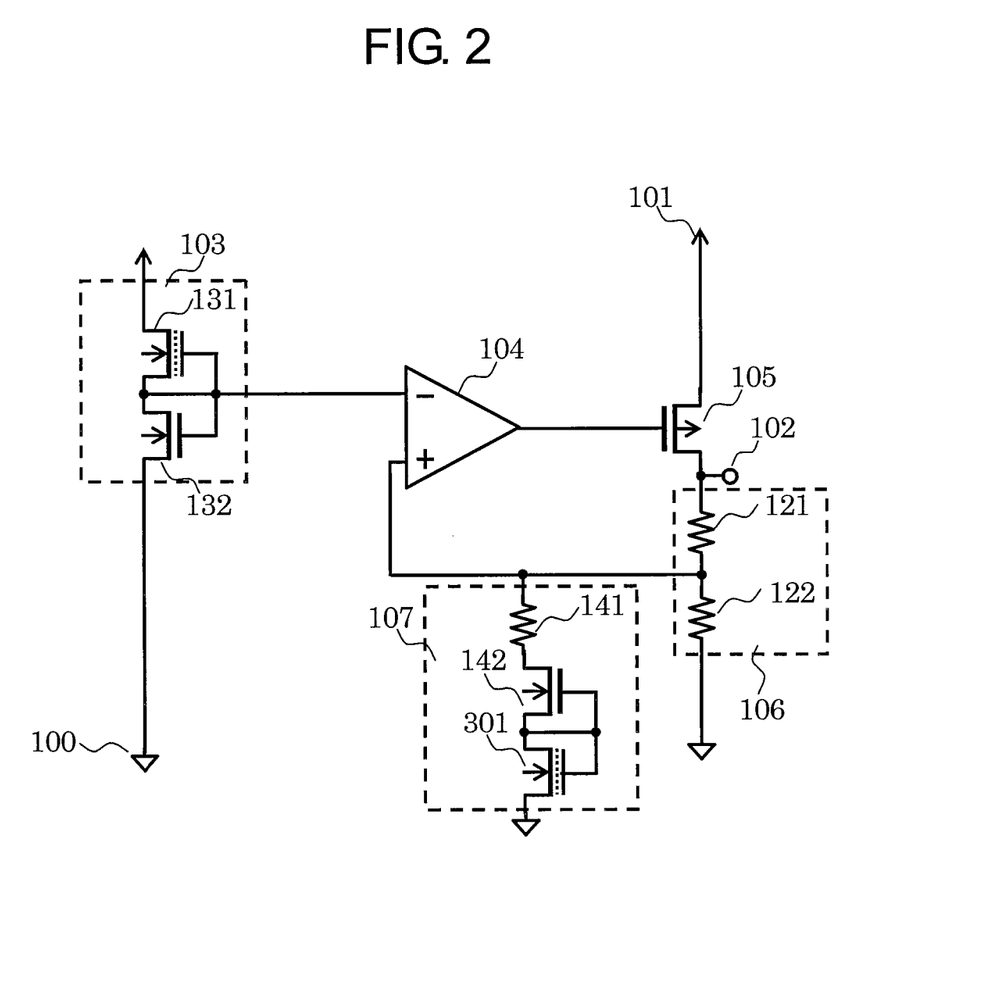
FIG. 2 is a circuit diagram illustrating a voltage regulator according to a second embodiment of the present invention.

FIG. 2 is a circuit diagram illustrating a voltage regulator according to a second embodiment of the present invention.

FIG. 2 differs from FIG. 1 in that the leakage current correction circuit 107 includes a depletion type NMOS transistor 301. The depletion type NMOS transistor 301 has a drain and a gate both connected to the gate and the source of the NMOS transistor 142, and a source connected to the ground terminal 100.

Next, the operations of the voltage regulator of the second embodiment are described. Because the gate and the source of the NMOS transistor 142 are connected to each other, the leakage current correction circuit 107 can cause the off leakage current to flow at high temperature, to thereby decrease the feedback voltage VFB. Due to the presence of the NMOS transistor 142, the depletion type NMOS transistor 301 does not cause a current to flow at normal temperature, but causes a junction leakage current only at high temperature. By using elements which have the same configurations as those of the NMOS transistor 132 and the depletion type NMOS transistor 131 that form the reference voltage circuit 103 as the elements of the leakage current correction circuit 107, the junction leakage current having the same characteristics as those of the junction leakage current of the elements forming the reference voltage circuit 103 can flow without being influenced by the process fluctuations and the temperature change. With this, the stable characteristics can be obtained even when the characteristics fluctuate due to the process dependence, and the feedback voltage VFB can be more accurately decreased by using the leakage current of the leakage current correction circuit 107 at high temperature so that the feedback voltage VFB can be kept to have the same value as that of the reference voltage VREF. In this way, the decrease in output voltage VOUT can be suppressed, and the accuracy of the output voltage VOUT can be kept within a certain range.

Note that, it is desired that the depletion type NMOS transistor 131 forming the reference voltage circuit 103 and the depletion type NMOS transistor 301 be arranged on the same well. In addition, the reference voltage circuit may have any configuration without limitation as long as the operations of the present invention are achieved.

As described above, the leakage current correction circuit 107 includes the depletion type NMOS transistor, and hence the elements having the same configurations as those of the elements in the reference voltage circuit 103 are used. Thus, the feedback voltage VFB can be decreased by using the leakage current that is less influenced by the process fluctuations between the leakage current correction circuit 107 and the reference voltage circuit 103. Thus, the decrease in output voltage VOUT can be accurately suppressed, and it is therefore possible to keep the accuracy of the output voltage VOUT within a certain range.

Third Embodiment

Figure 3:
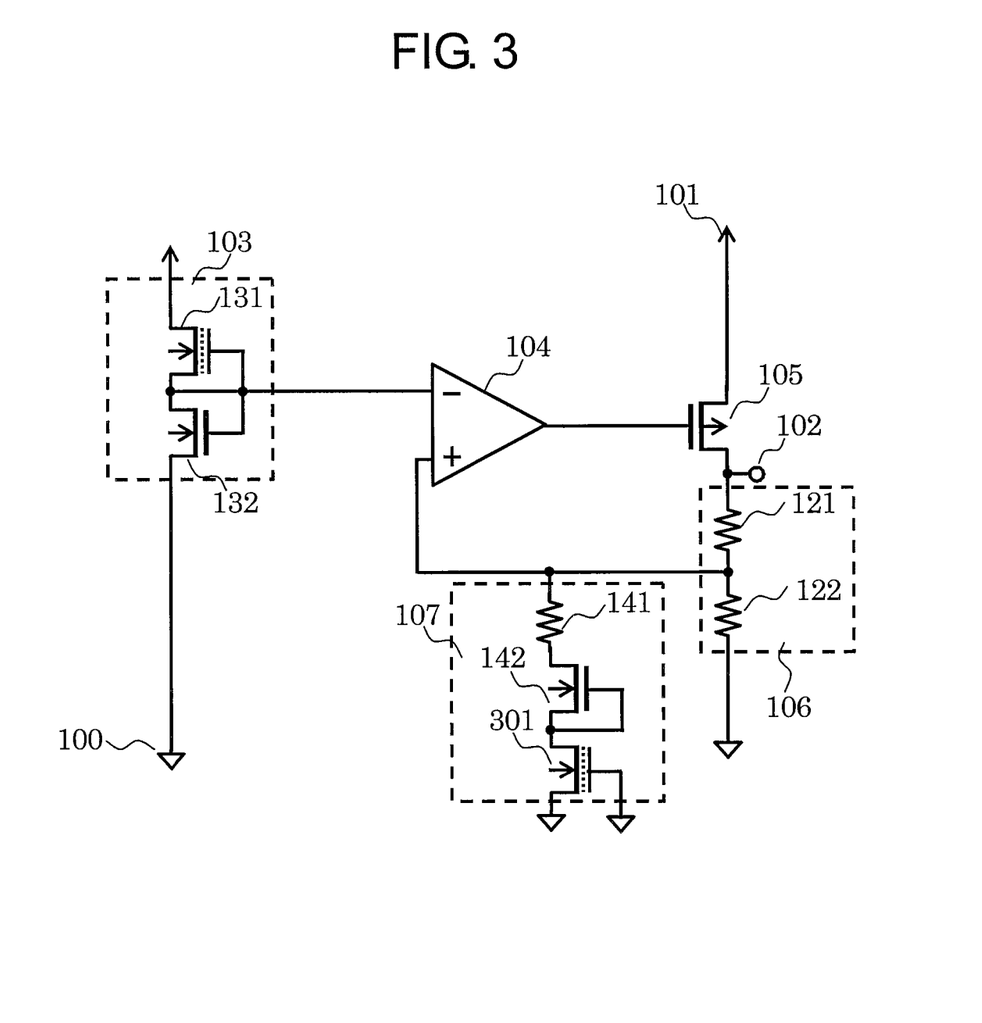
FIG. 3 is a circuit diagram illustrating a voltage regulator according to a third embodiment of the present invention.

FIG. 3 is a circuit diagram illustrating a voltage regulator according to a third embodiment of the present invention. FIG. 3 differs from FIG. 2 in that the gate of the depletion type NMOS transistor 301 is connected to the ground terminal 100.

Next, the operations of the voltage regulator of the third embodiment are described. Because the gate and the source of the NMOS transistor 142 are connected to each other, the leakage current correction circuit 107 can cause the off leakage current to flow at high temperature, to thereby decrease the feedback voltage VFB. Due to the presence of the NMOS transistor 142, the depletion type NMOS transistor 301 does not cause a current to flow at normal temperature, but causes a junction leakage current only at high temperature. Therefore, no current flows at normal temperature even when the gate of the depletion type NMOS transistor 301 is connected to the ground terminal. The junction leakage current at high temperature is the same also in this case, and hence the junction leakage current having the same characteristics as those of the leakage current of the reference voltage circuit 103 can flow, to thereby suppress the process fluctuations. Other operations are the same as the operations described above referring to FIG. 2.

As described above, the leakage current correction circuit 107 includes the depletion type NMOS transistor, and hence the elements having the same configurations as those of the elements in the reference voltage circuit 103 are used. Thus, the feedback voltage VFB can be decreased by using the leakage current that is less influenced by the process fluctuations between the leakage current correction circuit 107 and the reference voltage circuit 103. Thus, the decrease in output voltage VOUT can be accurately suppressed, and it is therefore possible to keep the accuracy of the output voltage VOUT within a certain range.

As described above, according to the voltage regulator including the leakage current correction circuit of the present invention, even when the reference voltage of the reference voltage circuit 103 drops due to the leakage current flowing at high temperature, the leakage current correction circuit can decrease the feedback voltage VFB in accordance with the drop, and it is therefore possible to suppress the decrease in output voltage VOUT.

Note that, when the voltage regulator including the leakage current correction circuit of the present invention has a configuration described below, it is possible to further improve the functions and the accuracy.

Figure 4:
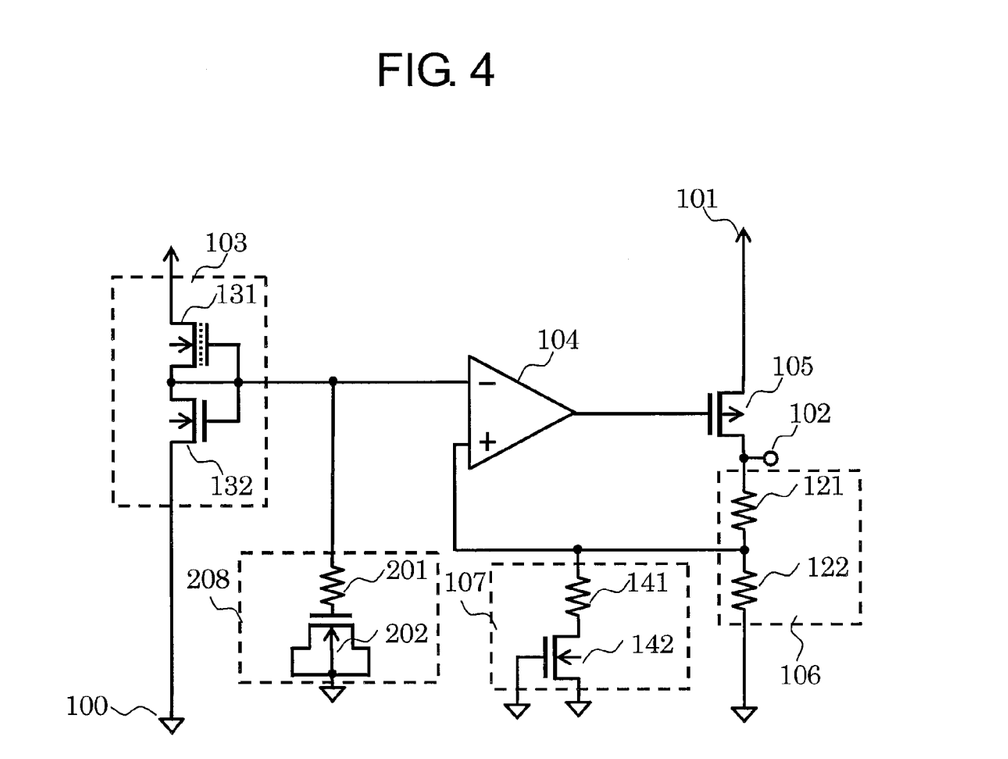
FIG. 4 is a circuit diagram illustrating the voltage regulator of the present invention, to which a capacitance correction circuit is added.

FIG. 4 is a circuit diagram illustrating the voltage regulator of the present invention, to which a capacitance correction circuit 208 is added. FIG. 4 differs from FIG. 1 in that the capacitance correction circuit 208 is connected to the inverting input terminal of the differential amplifier circuit 104. The capacitance correction circuit 208 includes an NMOS transistor 202 and a resistor 201. The NMOS transistor 202 has a drain, a source, and a substrate all connected to the ground terminal 100, and a gate connected via the resistor 201 to the inverting input terminal of the differential amplifier circuit 104. In this case, the capacitance value of the capacitance correction circuit 208 is set equal to the parasitic capacitance of the leakage current correction circuit 107.

When the voltage regulator of the present invention includes the capacitance correction circuit 208, the influence of the parasitic capacitance of the leakage current correction circuit 107 can be canceled out to improve the stability of the circuit operation.

Figure 5:
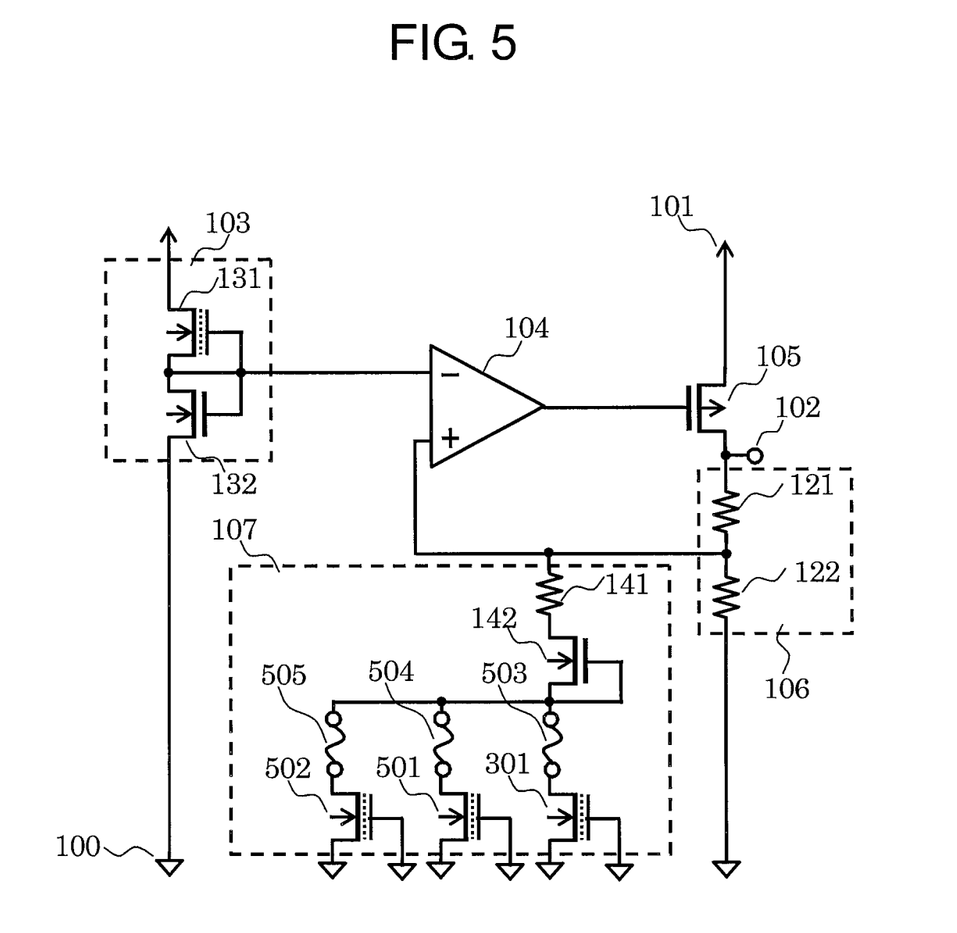
FIG. 5 is a circuit diagram illustrating an exemplary configuration for improving the accuracy of a leakage current correction circuit of the voltage regulator of the present invention.

FIG. 5 is a circuit diagram illustrating an exemplary configuration for improving the accuracy of the leakage current correction circuit 107 of the voltage regulator of the present invention. The leakage current correction circuit 107 includes, for example, depletion type NMOS transistors 301, 501, and 502 that are connected in parallel to each other, and can trim the depletion type NMOS transistors by fuses 503, 504, and 505. Therefore, the depletion type NMOS transistors 301, 501, and 502 can be trimmed so that the leakage current characteristics of the leakage current correction circuit 107 can have an optimal value.

Note that, those configurations are applicable to the circuit of all of the embodiments.

What is claimed is:

1. A voltage regulator, comprising:
   a reference voltage circuit configured to output a reference voltage;
   an output transistor configured to output an output voltage;
   a voltage divider circuit configured to divide the output voltage to output a feedback voltage;
   an error amplifier circuit configured to amplify a difference between the reference voltage and the feedback voltage, and output the amplified difference to control a gate of the output transistor; and
   a leakage current correction circuit connected to an output terminal of the voltage divider circuit,
   the leakage current correction circuit being configured to decrease the feedback voltage to prevent the output voltage from dropping at high temperature;
   wherein the leakage current correction circuit comprises:
   a resistor;
   a first transistor including a gate and a source connected to each other, and a drain connected via the resistor to the output terminal of the voltage divider circuit; and
   a second transistor including a drain connected to the gate and the source of the first transistor, and a source connected to a ground terminal.

2. A voltage regulator according to claim 1, wherein the leakage current correction circuit comprises:
   a resistor; and
   a transistor including a gate and a source both connected to a ground terminal, and a drain connected via the resistor to the output terminal of the voltage divider circuit.

3. A voltage regulator according to claim 1, wherein the first transistor and the second transistor that form the leakage current correction circuit have the same configurations as configurations of transistors forming the reference voltage circuit.

* * * * *